(12) United States Patent
Shiraki et al.

(10) Patent No.: US 8,775,261 B2
(45) Date of Patent: Jul. 8, 2014

(54) NETWORK ADVERTISEMENT DELIVERY SYSTEM

(75) Inventors: Takashi Shiraki, Tokyo (JP); Junichi Kokudo, Tokyo (JP); Yoshihiro Ono, Tokyo (JP); Takehiko Kashiwagi, Tokyo (JP)

(73) Assignee: NEC Corporation, Tokyo (JP)

( * ) Notice: Subject to any disclaimer, the term of this patent is extended or adjusted under 35 U.S.C. 154(b) by 647 days.

(21) Appl. No.: 11/790,799

(22) Filed: Apr. 27, 2007

(65) Prior Publication Data

US 2007/0252004 A1 Nov. 1, 2007

(30) Foreign Application Priority Data

Apr. 28, 2006 (JP) ................................. 2006-125421

(51) Int. Cl.
 *G06Q 10/00* (2012.01)
 *G06K 15/00* (2006.01)

(52) U.S. Cl.
 USPC .......................... 705/26.1; 705/27.1; 235/383

(58) Field of Classification Search
 USPC ............. 705/14, 27, 26.1, 27.1; 235/200–423
 See application file for complete search history.

(56) References Cited

U.S. PATENT DOCUMENTS

| | | | |
|---|---|---|---|
| 6,029,141 A * | 2/2000 | Bezos et al. ................. | 705/27 |
| 6,917,922 B1 | 7/2005 | Bezos et al. | |
| 7,433,832 B1 | 10/2008 | Bezos et al. | |
| 7,478,054 B1 | 1/2009 | Adams et al. | |
| 7,664,669 B1 | 2/2010 | Adams et al. | |
| 7,672,874 B2 | 3/2010 | Bezos et al. | |
| 7,778,890 B1 | 8/2010 | Bezos et al. | |
| 8,027,884 B2 | 9/2011 | Bezos et al. | |

(Continued)

FOREIGN PATENT DOCUMENTS

| JP | 2001-266001 (A) | 9/2001 |
|---|---|---|
| JP | 2002-056000 | 2/2002 |

(Continued)

OTHER PUBLICATIONS

European Search Report dated Aug. 9, 2007.

(Continued)

*Primary Examiner* — Sun Li
(74) *Attorney, Agent, or Firm* — McGinn IP Law Group, PLLC

(57) ABSTRACT

In a network advertisement system, an information processing section includes a module to store, when sales or service operation is conducted for a first terminal, purchase history of articles or services of the first terminal; and a Social Network Service includes an extraction module to extract, on receiving from the module a notification of the reception of the article or service by the first terminal, registered users related to the user of the first terminal. The SNS notifies the reception of the article or service by the first terminal to terminals of the registered users thus extracted. When a second terminal receives purchase of an article or provision of a service on the basis of the notification of purchase information of plural users, a degree of contribution to the sales promotion is expressed by a numeric value for each of the plural users by referring to the shop server and the SNS to reflect the degree of contribution to the affiliate. Therefore, in the network advertisement system, when a user purchases an article, information of the article is notified to friends of the user to thereby automatically provide an amount of affiliate to the user or a plurality of users.

18 Claims, 9 Drawing Sheets

(56) References Cited

U.S. PATENT DOCUMENTS

| | | | |
|---|---|---|---|
| 2001/0020231 A1* | 9/2001 | Perri et al. | 705/14 |
| 2003/0126096 A1 | 7/2003 | Pelletier | |
| 2005/0102197 A1* | 5/2005 | Page et al. | 705/26 |
| 2005/0154651 A1 | 7/2005 | Bezos et al. | |
| 2005/0154652 A1 | 7/2005 | Bezos et al. | |
| 2005/0203807 A1 | 9/2005 | Bezos et al. | |
| 2010/0138319 A1 | 6/2010 | Bezos et al. | |
| 2012/0016768 A1 | 1/2012 | Bezos et al. | |

FOREIGN PATENT DOCUMENTS

| | | |
|---|---|---|
| JP | 2002-083213 | 3/2002 |
| JP | 2004-54381 (A) | 2/2004 |
| JP | 2005-202734 (A) | 7/2005 |
| JP | 2006-59257 (A) | 3/2006 |
| WO | WO 01/67284 A2 | 9/2001 |
| WO | WO 02/42977 A2 | 5/2002 |
| WO | WO 03/005151 A2 | 1/2003 |

OTHER PUBLICATIONS

Japanese Office Action dated Nov. 15, 2011 (with a partial English translation).

* cited by examiner

F I G. 10
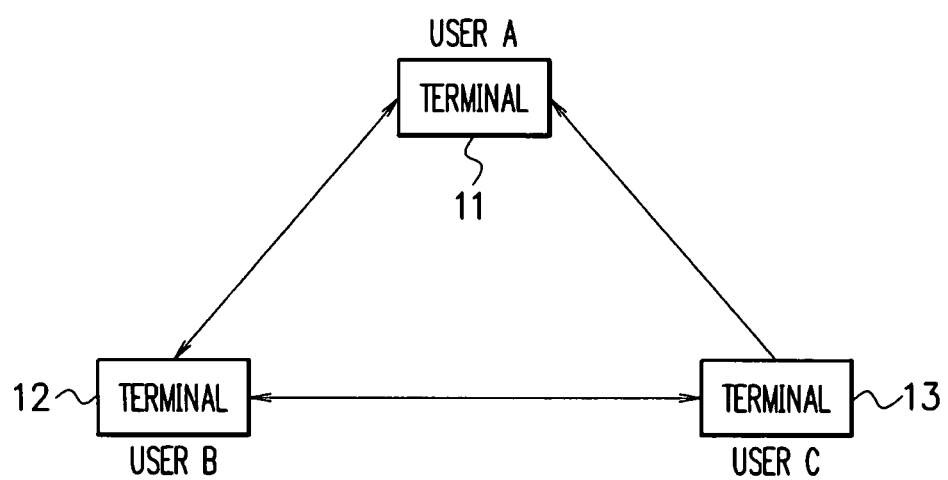

NETWORK ADVERTISEMENT DELIVERY SYSTEM

BACKGROUND OF THE INVENTION

1. Field of the Invention

The present invention relates to a network advertisement delivery system for conducting sales management of articles on the Internet using a social network service system.

2. Description of the Related Art

In a conventional affiliate providing model to provide sales promotion commissions, i.e., affiliate using homepages on the Internet, a user having actually purchased an article or not having actually purchased an article writes a recommendation item to guide or lead potential purchasers to the associated site of the recommendation item.

Referring now to FIG. 1, description will be given of a conventional affiliate advertisement model.

As can be seen from FIG. 1, the model includes an affiliater 100 to receive an affiliate commission and a buyer 200 to purchase items. The affiliater 100 and the buyer 200 are different entities. The affiliater 100 registers in the affiliate system in steps (1) and (2) and sets a recommendation item in step (3). The buyer 200 refers via a web site 300 to items in a shop 400 in steps (4) and (5). The sales contract is made in steps (6) and (7). In steps (8) and (8'), a commission for sales promotion, that is, an amount of affiliate corresponding to the purchase of the sales contract is provided to the affiliater 100.

Japanese Patent Laid-Open No. 2002-56000 (document 1) describes a web server which manages a friend database for each subscriber and which promotes communications between friends among the subscribers for a smooth operation of the community. Japanese Patent Laid-Open No. 2002-83213 (document 2) proposes a network advertisement method and a network advertisement system to efficiently advertise articles using web pages.

However, the conventional network advertisement delivery system has problems as below.

For example, there exists a problem of insufficient reliability. In the system, a user not having bought an article is also allowed to write a recommendation item. There possibly appears a person who poses as a customer in conspiracy with a seller to induce other customers to buy articles. This leads to the problem of reliability. In addition, sites of someone who keeps anonymity or who is not a friend of the user are unreliable.

Additionally, it also leads to a problem that whether the purchase has been carried out is not reflected on the reliability. There also exists a problem that the commission is provided according to a rating method irrespectively of the amount of purchase. In the affiliate systems available at present, it is not possible to provide the affiliate or commission to a plurality of affiliaters for one purchase of an article.

There does not exist a method to evaluate the rating of the affiliate to each of affiliaters according the amounts of purchase. In the actual commercial distribution and the existing affiliate systems, the amount of affiliate fluctuates along with the amount of new sales of articles. However, the rating is not changed, according to the sales amount in the past, for the affiliate with respect to the new sales event.

There also exists a problem in describing or inputting of a recommendation item. When terminals such as a cellular phone not suitable for the input operation of the recommendation item are used, it takes a considerably long time for the user to describe the recommendation item. A demand hence exists for a simple input method to write recommendation items.

SUMMARY OF THE INVENTION

Disclosed herein is a network advertisement system in which when a user purchases an article, information about articles is notified to friends of the user to thereby provide a sales promotion commission, i.e., an amount of affiliate to the user.

There is provided in accordance with a first aspect of the present invention a network advertisement delivery system including a plurality of terminals including a first terminal and a second terminal, a first information processing section that stores purchase information when users corresponding to each of the terminals purchase articles or services, and a second information processing section that stores information of terminals and association between the terminals. Purchase information of the first terminal is sent to the second information processing section from the first information processing section. The second information processing section sends the purchase information of the first terminal to the second terminal that was extracted as having the association to the first terminal.

In accordance with a second aspect of the present invention, the users may purchase the articles or services from commercial sites.

In accordance with a third aspect of the present invention, the first or second information processing section issues a user IDentifier (ID) in response to registration of a user of each of the terminals.

In accordance with a fourth aspect of the present invention, the second information processing section issues, when a terminal registers association to other terminals, a registration request for association, and a terminal to be associated determines, according to information contained in a response to the registration request, whether the registration is conducted.

In accordance with a fifth aspect of the present invention, a terminal sets a condition that during or after registration of association, the terminal approves or rejects a registration request from another terminal.

In accordance with a sixth aspect of the present invention, when the second terminal conducts a delivery request registration to request the second information processing section to deliver the purchase information of the first terminal to the second terminal, the second information processing section notifies the first terminal of a message that the second terminal desires the delivery request registration, and the second information processing section determines, according to information contained in a response to the deliver request registration, whether the registration is to be conducted.

In accordance with a seventh aspect of the present invention, a terminal sets a condition that during or after the registration to the second information processing section, the terminal approves or rejects a delivery registration request from another terminal.

In accordance with an eighth aspect of the present invention, if an event that the first terminal has received an article or a service provided from the first information processing section has been notified to the second terminal, when the second terminal receives from the first information processing section an article or a service that is substantially equal to or is associated with the article or the service provided to the first terminal, an amount of affiliate is provided from the first information processing section to the second information processing section.

In accordance with a ninth aspect of the present invention, the second information processing section delivers an amount of affiliate to the first terminal.

In accordance with a tenth aspect of the present invention, the second information processing section stores association information of a relationship between the groups of users and the terminals, and the first information processing section delivers an amount of affiliate to the first terminal according the association information stored by the second information processing section.

In accordance with an 11th aspect of the present invention, at delivery of an amount of affiliate to the first terminal, if there exist targets to which an amount of affiliate is to be delivered and an amount of affiliate is delivered to the terminals, the first or second information processing section delivers an amount of affiliate to each of the terminals according to information about the number of articles purchased by a user of a terminal, information about the number of services provided, or information about an amount of money of the articles or services.

In accordance with a 12th aspect of the present invention, the relationship indicates closeness and reliability between users of terminals.

In accordance with a 13th aspect of the present invention, after the relationship is established between the first and second terminals, the second terminal sets closeness with respect to the user of the first terminal, and modifies and deletes the relationship.

In accordance with a 14th aspect of the present invention, after the relationship is established between the first and second terminals, the first terminal sets closeness with respect to the user of the second terminal, and modifies and deletes the relationship.

In accordance with a 15th aspect of the present invention, the second information processing section refers to the closeness and/or the reliability between the users of the first and second terminals and thereby determines a ratio for the delivery of the amount of affiliate according to the closeness and/or the reliability.

In accordance with a 16th aspect of the present invention, at least one of the terminals refers to a history of purchase of articles by other terminals.

In accordance with a 17th aspect of the present invention, when the second terminal receives an event of purchase of an article or provision of a service from the first information processing section, terminal to which the amount of affiliate is delivered, and a ratio of affiliate for terminals are designated.

In accordance with an 18th aspect of the present invention, in a situation in which the first terminal receives an event of purchase of an article or provision of a service from the first information processing section, it is restricted to notify the second terminal or other terminals of the reception of purchase of an article or provision of a service, the second terminal and other terminals being associated with the first terminal.

In accordance with an 19th aspect of the present invention, when the amount of affiliate is divided among terminals, the first or second information processing section divides the amount of affiliate based on when the user purchased articles or services.

In accordance with an 20th aspect of the present invention, there is provided a network advertisement delivery system comprising a plurality of terminals, wherein when terminals made a contribution to sales of articles or services, an amount of affiliate is divided among the terminals.

In accordance with the present invention, a second user can purchase an article or a service on the basis of reliable information including information of a first user having purchased an article or a service and information associated with a friendship between the first and second users. It is also possible for the purchaser or buyer to indirectly provide the affiliate to the user having notified the information.

BRIEF DESCRIPTION OF THE DRAWINGS

Features of the disclosed embodiments will be described by way of the following detailed description with reference to the accompanying drawings in which:

FIG. 10 is a diagram showing a relationship between terminals.

DESCRIPTION OF EXEMPLARY EMBODIMENTS

Figure 1:
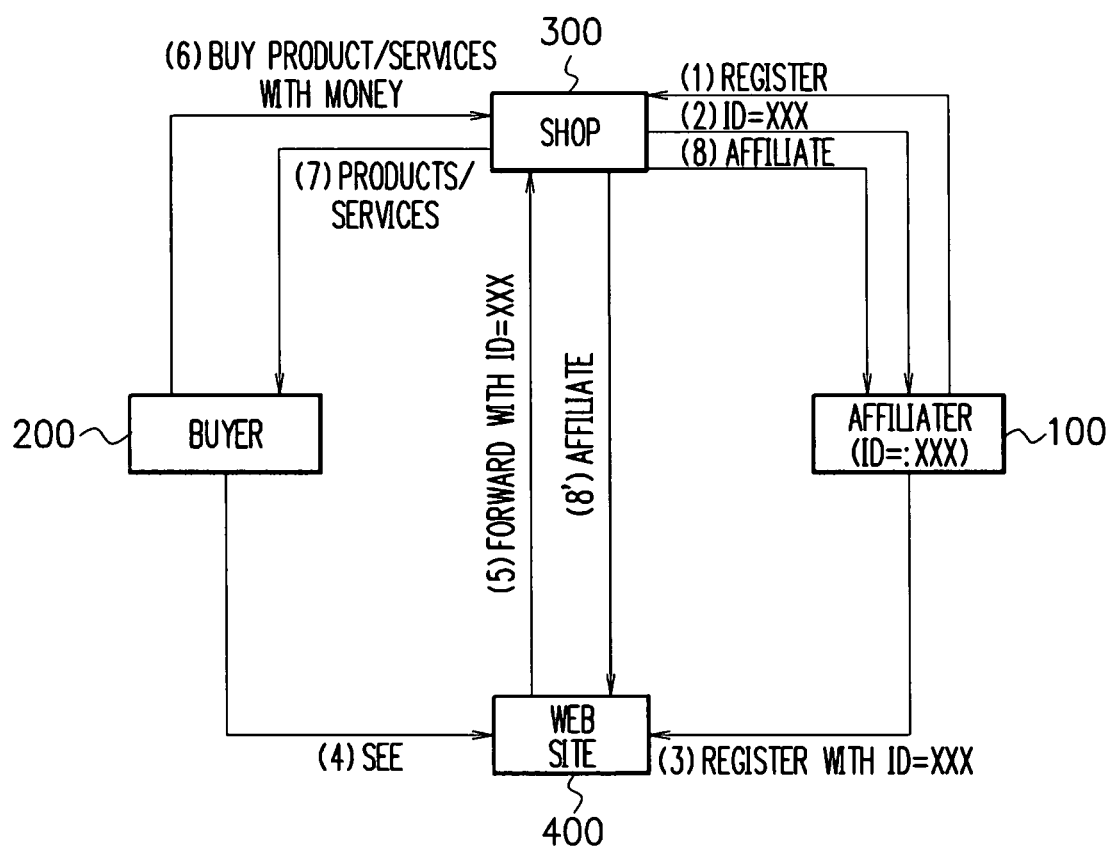
FIG. 1 is a block diagram showing a configuration of a conventional network advertisement delivery system.

Referring now to the drawings, description will be given of a network advertisement and a network advertisement system.

Figure 2:
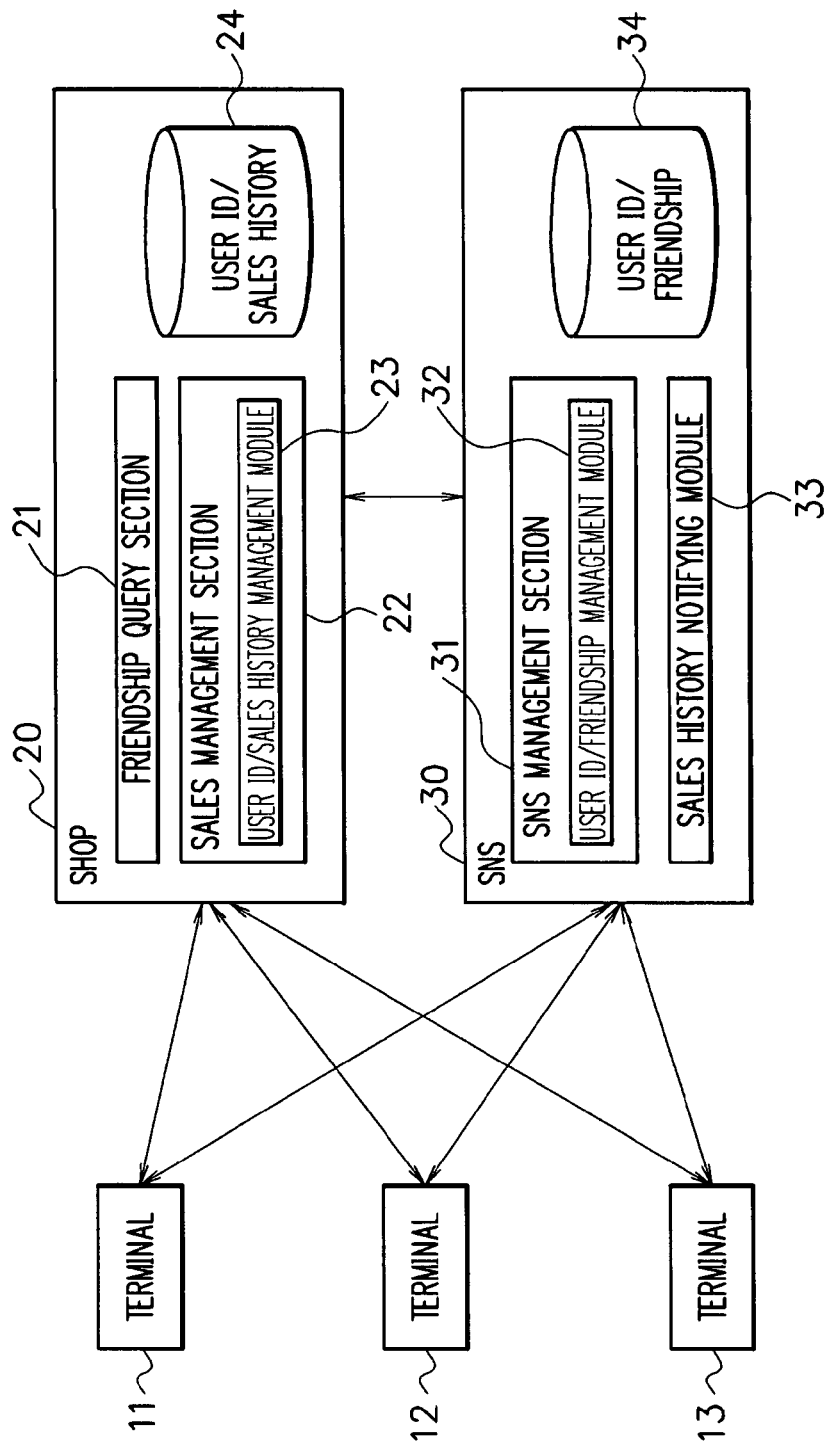
FIG. 2 is a schematic block diagram showing a configuration of a network advertisement delivery system of an embodiment.

FIG. 2 shows a configuration of a network advertisement system.

The system includes terminal 11 to 13, a shop 20, and a Social Network Service (SNS) 30. The terminals 11 to 13 are capable of purchasing articles such as a cellular phone, a personal computer (PC), and a Radio Frequency IDentifier (RFID) prepaid/postpaid card. It is also possible to adopt a terminal using an RFID, a magnetic ID, or the like to notify its ID to other systems or apparatuses. The terminal 11 is used to purchase articles in a shop to send information about friendships to the social network system 30.

The shop 20 includes a friendship query section 21, a sales management section 22, and a user ID/purchase history database 24. The section 22 includes a user ID/purchase history management section 23. The section 21 sends a query to an SNS management section 31 for a network of friendships between the terminals 11 to 13. The section 22 manages sales of articles and services and history data.

The section 23 accesses the database 24 to manage purchase history data. The database 24 keeps therein the purchase history for each user ID.

The social network service system 30 includes an SNS management module 31, a purchase history notification module 33, and a user ID/friendship database 34. The SNS management module 31 includes a user ID/friendship management module 32.

The SNS 30 provides users A to C as owners respectively of the terminals 11 to 13 with information of friendships and a communication service. The SNS manages information about objects having made a contribution to sales of articles and services and information about the degree of the contribution to determine the amount of affiliate to be provided.

The section 31 executes SNS service processing. The module 32 accesses the database 34 to manage the friendship data. The module 33 transmits, to the terminals 11 to 13, information of articles and/or services purchased by friends. The database 34 stores therein friendship information between the user identifiers.

Figure 3:
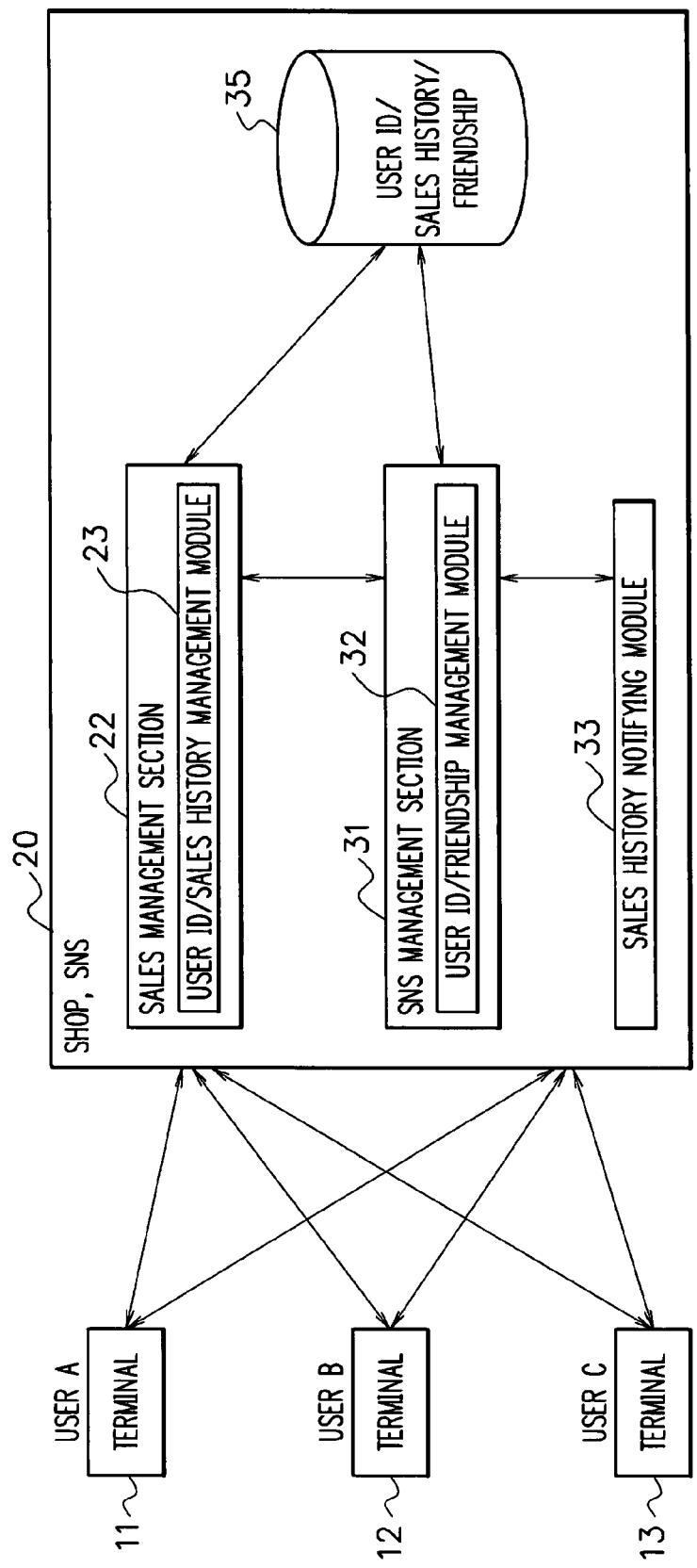
FIG. 3 is a block diagram schematically showing structure of a network advertisement delivery system.

In the configuration of FIG. 2, it is assumed that the shop 20 and the SNS 30 are used by mutually different companies for the sales and services, respectively. However, if the company for the sales also provides the services, the database 24 and the database 34 may be configured into one database, e.g., a user ID/purchase history/friendship database 35 as shown in FIG. 3.

Referring next to FIGS. 4 to 10, description will be given of an operation of the embodiment.

In the initial state, it is assumed that no data has been registered to the database 24 and the database 34.

Figure 4:
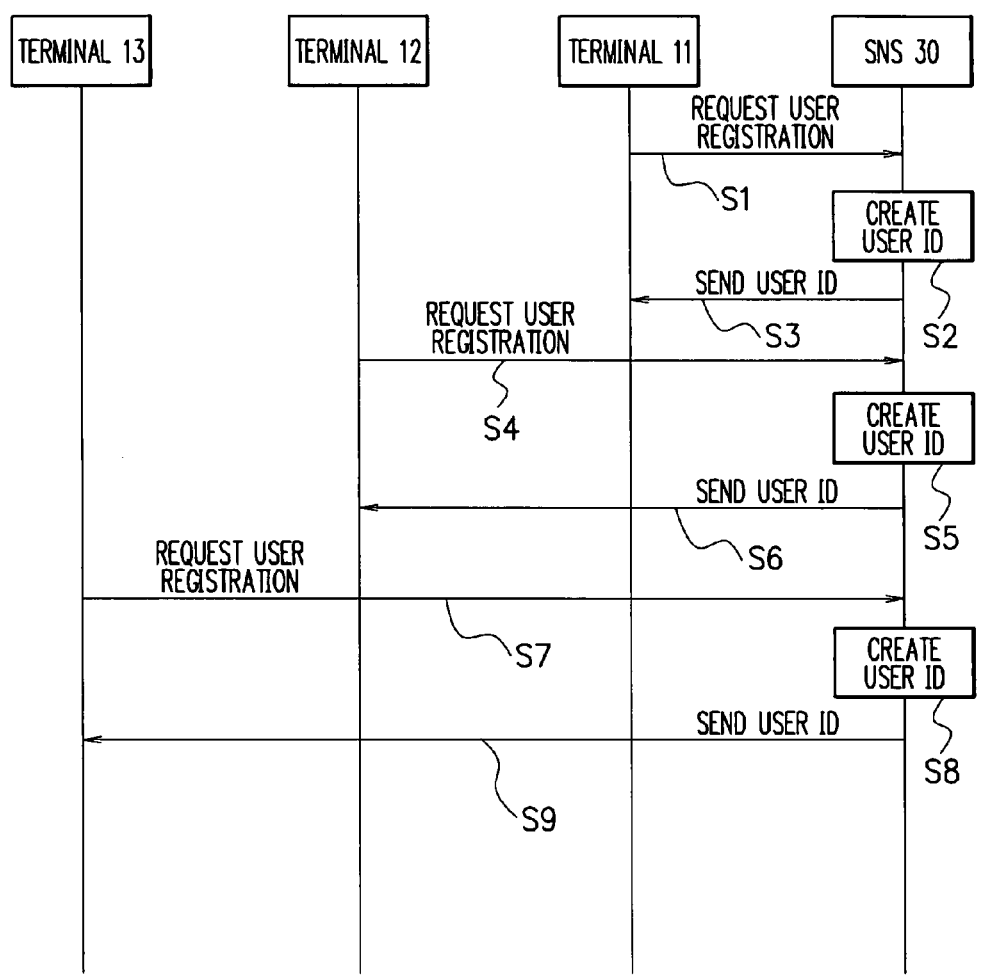
FIG. 4 is a flowchart showing processing of a network advertisement delivery system.

Referring to FIG. 4, description will be given of an operation of SNS services, namely, an operation to register a user and a friendship of the user from the terminals 11 to 13 to the SNS 30.

The terminal 11 conducts user registration to the SNS 30. The terminal 11 issues a request of user registration to the module 32 (step S1). The module 32 registers the user to the database 34 to generate a user ID (step S2). In this situation, ID='XXX' is assigned to the terminal 11, and the module 32 sends the user ID to the terminal 11 (step S3).

Subsequently, the terminal 12 carries out user registration to the SNS 30. The operation is similar to that of the user registration from the terminal 11 to the SNS 30. In this case, ID='YYY' is assigned to the terminal 12 (reference is to be made to steps S4 to S6). When the terminal 13 accomplishes user registration, ID='ZZZ' is assigned thereto (reference is to be made to steps S7 to S9).

Figure 5:
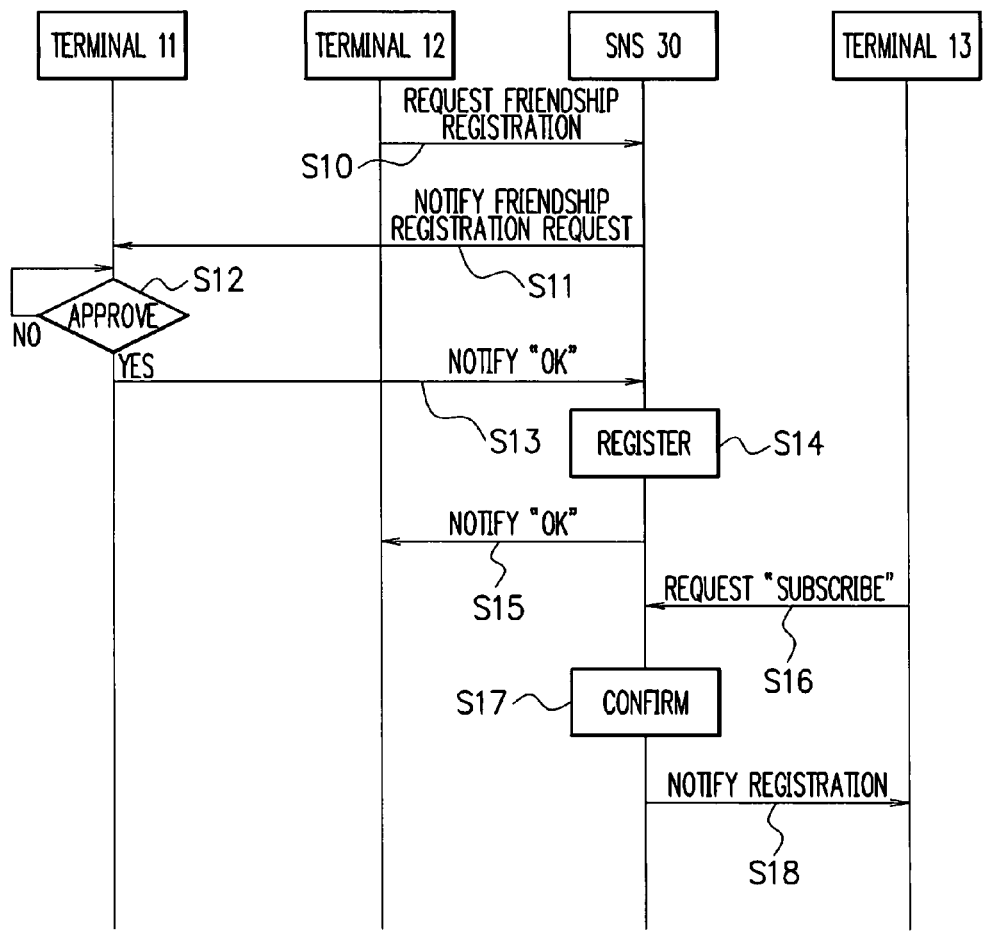
FIG. 5 is a flowchart showing processing of a network advertisement delivery system.

Next, referring to FIG. 5, description will be given of an operation in which the user of the terminal 12 requests the SNS 30 to register a friendship to the user of the terminal 11.

The terminal 12 issues a friendship registration request to the module 32 to register a friendship to the user of the terminal 11 (step S10). The module 32 notifies the request from the user of the terminal 12 to the terminal 11 (step S11). If the terminal 11 approves the request (yes in step S12), the terminal 11 notifies "OK" to the module 32 (step S13). The management module 32 notifies "OK" to the terminal 12 and registers the friendship between the terminals 11 and 12 to the database 34 (steps S14 and S15).

In this connection, it is possible to beforehand set a setting item to specify an operation as follows. After or when the terminal 11 conducts the user registration to the SNS 30, a friendship or relational registration request from any terminal or part of the terminals is to be approved or rejected. When some of the terminals are designated, the approval or rejection can be set for each user. Alternatively, it is possible to write a conditional expression such that users conforming to the expression is approved or rejected.

Thereafter, the user of the terminal 13 one-sidedly trusting an authoritative user of the terminal 11 one-sidedly issues a "subscribe" request, not the friendship request. In the embodiment, "subscribe" indicates a relationship in which when the terminal 11 or 12 purchases an article or receives a service, information of the purchase or the service is notified to the terminal 13. That is, the friendship on the SNS 30 means a relationship in which "subscribe" is bilaterally approved. In a one-sided "subscribe" procedure, the terminal 13 issues to the module 32 a one-sided subscribe request for the user of the terminal 11 (step S16). The module 32 confirms via the database 34 whether the terminal with ID='YYY' approves "subscribe" from a user who is not a friend of the terminal (step S17). Since "subscribe" is approved in the embodiment, "one-sided subscribe" from ID='ZZZ' to ID='YYY' is registered. The module 32 returns the result indicating the successful registration of "subscribe" to the terminal 13 (step S18).

In this regard, the user may set a setting item to specify an operation in advance as below. When the terminal 11 conducts the user registration to the SNS 30, a one-sided subscribe request from any terminal or part of the terminals is to be approved or rejected. When part of the terminals are designated, it is possible to set "approval" or "rejection" for each user. Or, the user may write a conditional expression to approve or reject users conforming to the expression.

Next, referring to FIGS. 6 and 7, description will be given of an operation when user A of the terminal 11 purchases an article (P) in the shop.

Figure 6:
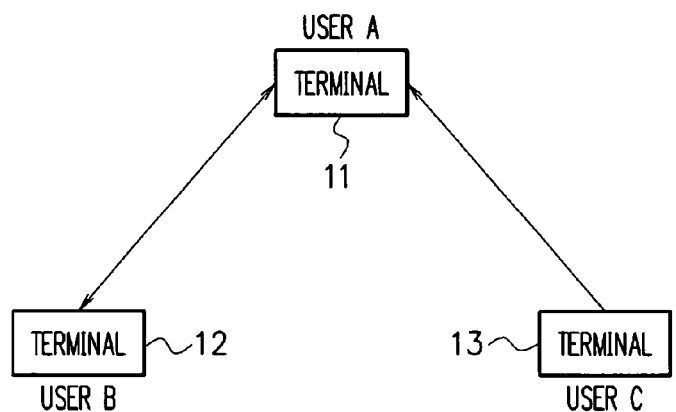
FIG. 6 is a flowchart showing processing of a network advertisement delivery system.

FIG. 6 shows a relationship between users A to C respectively of the terminals 11 to 13.

As shown in FIG. 6, a friendship exists between users A and B. User C issues a one-sided subscribe request to user A, and then the request is approved.

Figure 7:
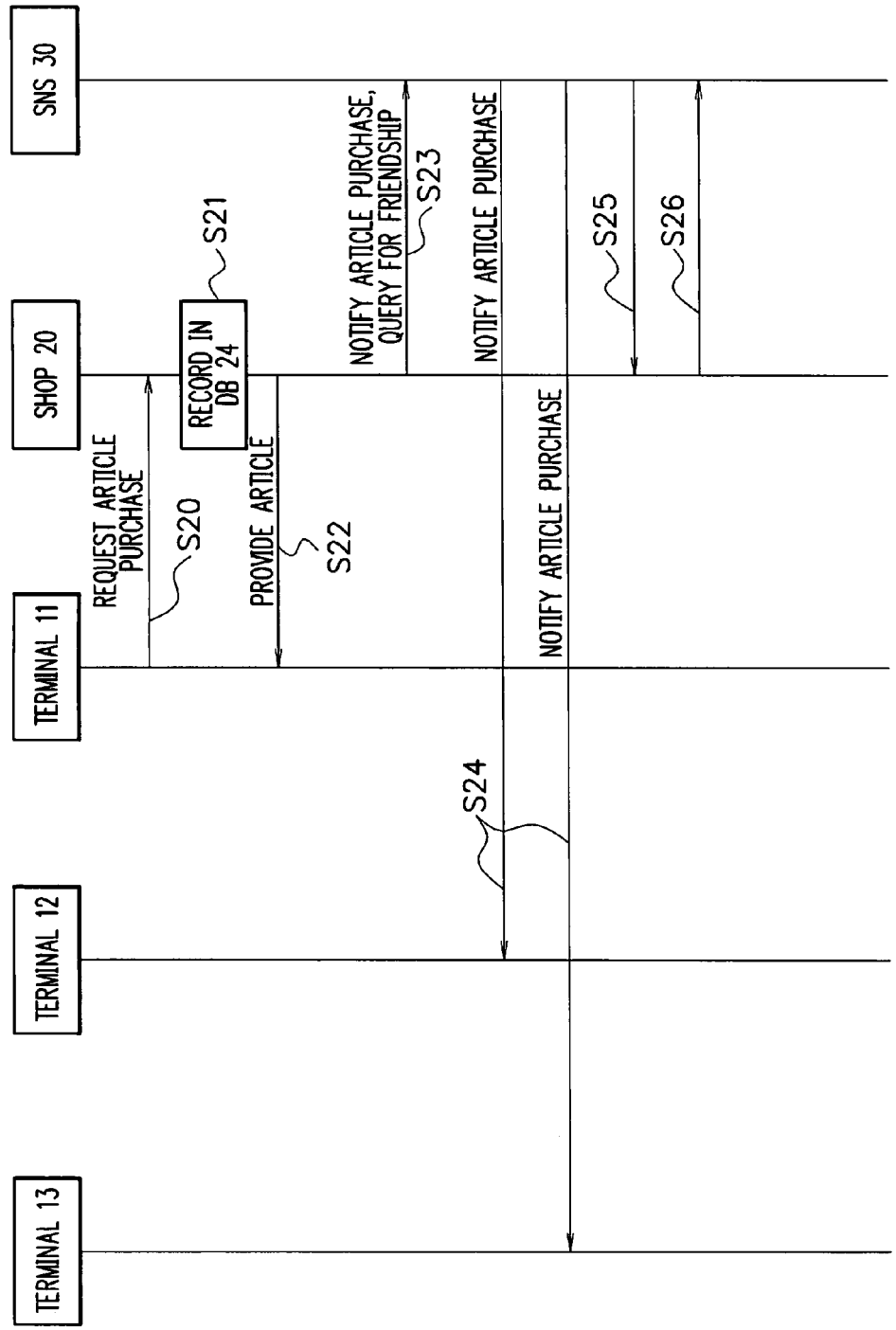
FIG. 7 is a diagram showing a relationship between terminals.

As can be seen from FIG. 7, the terminal 11 of user A issues a request to the module 22 of the shop 20 to buy three articles (P) using ID='XXX' (step S20). The module 22 provides three articles (P) to user A and records an event that ID='XXX' has bought three articles (P; steps S21 and S22), via the module 23 in the database 24.

The module 23 notifies the purchase of three articles (P) by ID='XXX' and a query for a friendship of ID='XXX' via the friendship query section 21 to the module 32 (step S23). The module 32 examines the friendship/subscribe state of ID='XXX' using the database 34 to resultantly obtain information that ID='YYY' is a friend and "subscribe" is received from ID='ZZZ'.

The module 32 notifies via the module 33 to the terminal 12 of ID='YYY' and the terminal 13 of ID='ZZZ' the event that ID='XXX' has purchased three articles (P; step S24).

Next, the module 32 notifies via the module 21 to the module 23 information that ID='XXX' is a friend of ID='YYY' and "subscribe" is sent from ID='ZZZ' (step S25). Thereafter, the module 23 makes a check to determine whether the database 24 contains a history of an event that ID='YYY' and ID='ZZZ' have purchased articles. The module 23 confirms that articles have not been purchased, and then notifies the event to the module 32 (step S26).

Figure 8:
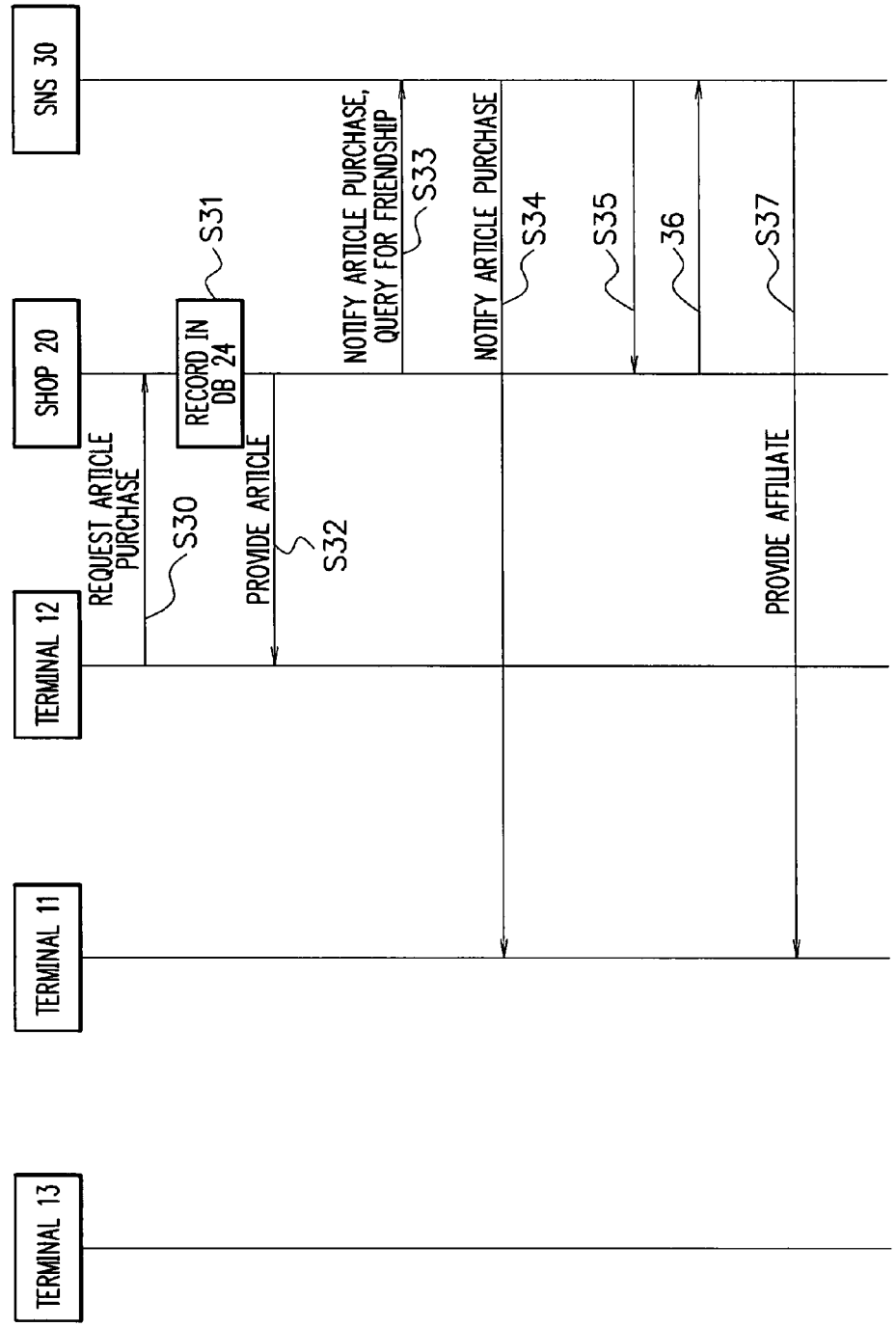
FIG. 8 is a flowchart showing processing of a network advertisement delivery system.

Referring next to FIG. 8, description will be given of an operation when user B of the terminal 12 purchases an article (P).

It has already been notified that user A of the terminal 11 has bought three articles (P). Reliability on articles (P) of user B of the terminal 12 is resultantly strengthened, and hence user B purchases the article (P). The shop 20 then delivers amounts of affiliate respectively to user A and the SNS 30 as the information provider according to degrees of the contribution to the sales promotion.

For the delivery, it is also possible to beforehand designate a delivery ratio of affiliate such that the amounts respectively of user A and the SNS 30 are determined according to the number of articles (P) bought by user B of the terminal 12 or a combination of the number of purchases and the ratio.

First, the terminal 12 of user B issues a purchase request to the section 22 of the shop 20 to purchase one article (P) using ID='YYY' (step S30). The section 22 supplies one article (P) to user B of the terminal 12 and records via the module 23 in the database 24 an event that ID='YYY' has bought one article (P; steps S31 and S32).

Subsequently, the section 22 notifies via the section 21 to the module 32 the event that ID='YYY' has purchased one article and issues a query via the section 21 to the module 32 for a friendship of ID='YYY' (step S33). The module 32 examines the state of friendship and "subscribe" of ID='YYY' by use of the database 34 to resultantly obtain information that ID='XXX' is a friend (ID='ZZZ' is not a friend and has not been subscribed).

The module 32 notifies via the module 33 to the terminal 11 of ID='XXX' the event that ID='YYY' has purchased one article (P; step S34; the event is not notified to ID='ZZZ'). The module 32 then notifies via the section 21 to the module 23 an event that ID='YYY' is a friend of ID='XXX' (step S35).

Thereafter, the module 23 makes a check to determine whether the database 24 contains a history of an event that ID='XXX' has bought the article (P) to resultantly acquire information that ID='XXX' has already bought three articles (P).

The module 23 then notifies to the SNS 30 an event that ID='XXX' has already bought three articles (P) and provides the SNS 30 with an amount of affiliate (step S36). The SNS 30 provides part of the affiliate to user A of the terminal 11 (step S37).

In the operation shown in FIG. 8, if user B purchases articles which are bought by user A, the delivery ratio of the affiliate can be changed according to the number of articles bought by user A.

Also, the terminals 12 and 13 may include a function to refer, at purchase of articles, to a purchase history of articles and associated articles of the terminal 11. It is possible to reflect the number of operations to refer to such history in the delivery of the affiliate.

Figure 9:
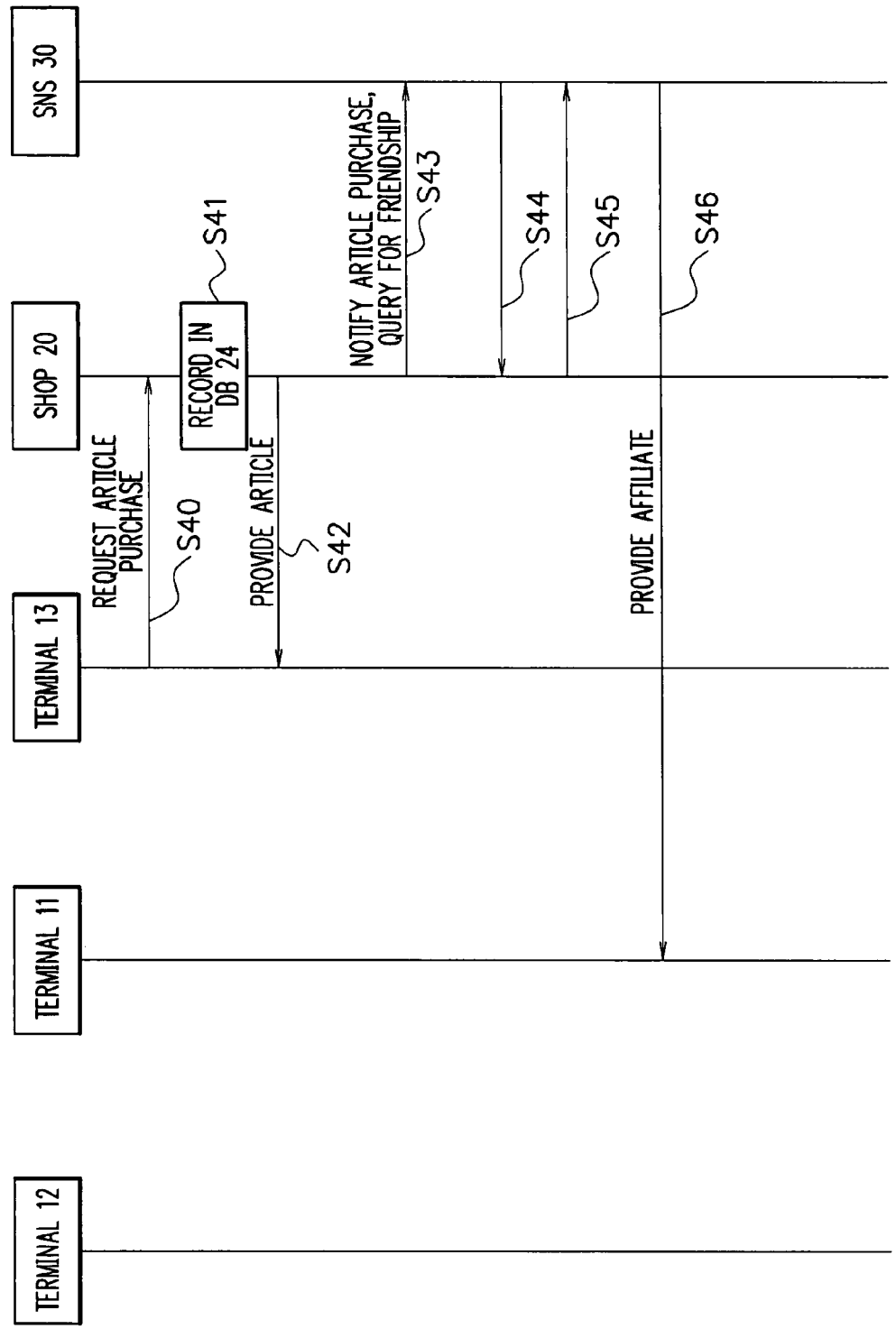
FIG. 9 is a flowchart showing processing of a network advertisement delivery system.

Referring now to FIG. 9, description will be given of an operation when user C of the terminal 13 purchases an article (P) in the shop 20.

It has already been notified to the terminal 13 that user A of the terminal 11 has bought three articles (P). For user C of the terminal 13, this enhances reliability of articles (P). Therefore, after the articles (P) are purchased, the shop 20 provides user A and the SNS 30 as an information provider with amounts of affiliate respectively according to delivery ratios corresponding to the respective degrees of contribution to sales promotion.

First, the terminal 13 of user C issues a purchase request to the section 22 of the shop 20 to buy one article (P) using ID='ZZZ' (step S40). The section 22 then provides one article (P) to user C of the terminal 11 and records via the module 23 in the database 24 an event that ID='ZZZ' has bought one article (P; steps S41 and S42).

The section 22 notifies via the section 21 to the module 32 the event of the purchase of one article (P) by ID='ZZZ' and similarly issues a query thereto for a friendship of ID='ZZZ' (step S43). The module 32 examines states of friendship and "subscribe" of ID='ZZZ' using the database 34 to resultantly attain information indicating that "subscribe" has been sent from ID='ZZZ' to ID='XXX' (ID='YYY' is neither a friend nor is subscribed).

The terminal with ID='ZZZ' does not require acquisition of information, and hence there does not exist a terminal to which the module 32 notifies information via the module 33. The module 32 sends information to neither ID='YYY' nor ID='ZZZ'.

The module 32 notifies via the module 21 to the module 23 that ID='XXX' has already been subscribed to ID='ZZZ' (step S44). The module 23 then makes a check to determine whether the database 24 contains a history that ID='XXX' has already bought an article (P), and acquires information that ID='XXX' has already bought three articles (P). The module 23 provides the SNS 30 with the event that ID='XXX' has already bought three articles (P) and with an amount of affiliate (step S45). The SNS 30 supplies part of the affiliate to user A of the terminal 11 (step S46).

In the above operation, only one terminal receives the affiliate for one purchase. However, it is also possible in the friendship/"subscribe" relationship shown in FIG. 10, for example, to provide at purchase of articles by the terminal 13, the affiliate to the terminal 11 having purchased three articles (P) and the terminal 12 having purchased one article (P). The ratio of the affiliate may be determined on the basis of the numbers of purchased articles in the purchase history, that is, the ratio may be set as "three to one".

In a system in which it is assumed that the friendship contributes to the sales promotion twice as much as the "subscribe" relationship, the ratio may also be set to "3 to (1×2)="3 to 2" depending on cases.

Moreover, the database 34 of the SNS 30 may include parameters indicating, for example, closeness between friends, i.e., users A to C respectively of the terminals 11 to 13. This enables the SNS 30 to alter the ratio to deliver the affiliate by referring to the parameters.

The system may include not only the function to restrict the open range of the purchase history for each purchase to open the history to the associated persons, but also a function to determine whether the history is to be opened on the basis of a level and/or a kind of friends designated in advance. The friend level may be, for example, closeness of the friend and a "hop count" indicating the number of accesses to the friend. The closeness may be directly specified by the user. There may also be used dynamically altering indices such as the number of calls via a cellular phone and the actual result of sales promotion (affiliate) in the past. The hop count is one of the closeness indices and takes, for example, a value of one for a direct friend and a value of two for a friend of a friend. The kind of friend is used, for example, as follows. If the user is a member of a soccer community and purchases an article for soccer, the purchase history is opened to the members of the community.

In the embodiment, if a third party purchases an article, the system may deliver the affiliate to the persons having already bought the article. The delivery ratio of each person may be set as follows. A highest ratio is set to the person who has purchased the article most recently or who has purchased the greatest number of articles. Or, the contents of the recommendation item, the number of operations to refer to the recommendation item, the period of time used to refer thereto, or the results of affiliate or the user for the article in the past may also be reflected in the decision of the delivery ratio.

In accordance with the present invention, the affiliate may be distributed, as in the conventional art, to a plurality of users for whom the purchase of the article is not confirmed. It is also possible to vary the ratio between a user with an evidence of the purchase of the article and a user for whom the purchase of the article is not confirmed.

Moreover, the affiliate need not be necessarily delivered when the article under consideration is purchased. That is, even if an article produced by the producer of the article under consideration or an article of another producer is purchased, the affiliate may also be delivered. In this situation, the delivery ratio of the affiliate may be changed depending on whether the article purchased is the same as the article under consideration or another article associated therewith.

If it is allowed that, after the user purchases an article, the user adds an additional recommendation item to the recommendation item beforehand described, other users can read the latest recommendation item, leading to sales promotion for the article.

By changing the affiliate delivery ratio according to the point of time of the purchase of the article, for example, by increasing the affiliate delivery ratio for a time zone in which the shop 20 is less frequently accessed to purchase articles, it can be expected that the number of accesses becomes larger and the number of purchased articles is increased.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A network advertisement delivery system, comprising:
a plurality of terminals including a first terminal and a second terminal, the second terminal being extracted as having an association to the first terminal;
a first information processing section that stores purchase information when users corresponding to each of the terminals purchase articles or services; and
a second information processing section that stores information of terminals and association between the terminals,
wherein purchase information of the first terminal is sent to the second information processing section from the first information processing section,
wherein the second information processing section sends the purchase information of the first terminal to the second terminal,
wherein when the second terminal is notified that the first terminal has received an article or a service from the first information processing section and when the second terminal receives from the first information processing section an article or a service substantially equal to or associated with the article or the service provided to the first terminal, the first information processing section provides an amount of affiliate to the second information processing section,
wherein the second information processing section stores association information of a relationship between groups of users and the terminals,
wherein the first information processing section delivers the amount of affiliate to the first terminal according the association information stored by the second information processing section,
wherein the second terminal issues a friendship registration request to a module of the second information processing section to register a friendship to a user of the first terminal,
wherein the module notifies the request from a user of the second terminal to the first terminal,
wherein, after the first terminal approves the request, the first terminal notifies to the module and the module notifies to the second terminal and registers the friendship between the first terminal and the second terminal, and
wherein, after the friendship between the first terminal and the second terminal is registered, the module notifies to the second terminal an event that the user of the first terminal has purchased articles
wherein the plurality of terminals further includes a third terminal that issues a one-sided subscribe request to the user of the first terminal.

2. The network advertisement delivery system in accordance with claim 1, wherein the users purchase the articles or the services from commercial sites.

3. The network advertisement delivery system in accordance with claim 1, wherein the first or the second information processing section issues a user IDentifier (ID) in response to registration of a user of each of the terminals.

4. The network advertisement delivery system in accordance with claim 1, wherein the second information processing section issues, when a terminal registers association to other terminals, a registration request for association, and
wherein a terminal to be associated determines, according to information contained in a response to the registration request, whether the registration is conducted.

5. The network advertisement delivery system in accordance with claim 1, wherein a terminal sets a condition that during or after registration of the association, the terminal approves or rejects a registration request from another terminal.

6. The network advertisement delivery system in accordance with claim 1, wherein when the second terminal conducts a delivery request registration to request the second information processing section to deliver the purchase information of the first terminal to the second terminal, the second information processing section notifies the first terminal of a message that the second terminal desires the delivery request registration, and
wherein the second information processing section determines, according to information contained in a response to the delivery request registration, whether the registration is to be conducted.

7. The network advertisement delivery system in accordance with claim 1, wherein the second information processing section delivers the amount of affiliate to the first terminal.

8. The network advertisement delivery system in accordance with claim 7, wherein at delivery of the amount of affiliate to a plurality of terminals including the first terminal, the first or second information processing section delivers the amount of affiliate to each of the terminals according to information about a number of articles purchased by a user of a terminal, information about a number of services provided, or information about an amount of money of the articles or the services.

9. The network advertisement delivery system in accordance with claim 8, wherein one of the first information processing section and the second information processing section delivers the amount of the affiliate to each of the terminals, which created a history of operation including at least one of a purchase and a reference of the same article or the same service.

10. The network advertisement delivery system in accordance with claim 7, wherein when the amount of affiliate is divided among terminals, the first or second information processing section divides the amount of affiliate based on when the users purchased the articles or the services.

11. The network advertisement delivery system in accordance with claim 1, wherein the relationship indicates closeness and reliability between users of the terminals.

12. The network advertisement delivery system in accordance with claim 1, wherein after the relationship is established between the first and second terminals, the second terminal sets closeness with respect to a user of the first terminal, and modifies and deletes the relationship.

13. The network advertisement delivery system in accordance with claim 1, wherein after the relationship is established between the first and second terminals, the first terminal sets closeness with respect to a user of the second terminal, and modifies and deletes the relationship.

14. The network advertisement delivery system in accordance with claim 1, wherein the second information processing section refers to at least one of closeness and reliability between users of the first and second terminals and thereby determines a ratio for a delivery of the amount of affiliate according to at least one of the closeness and the reliability.

15. The network advertisement delivery system in accordance with claim 1, wherein at least one of the terminals refers to a history of purchase of the articles by other terminals.

16. The network advertisement delivery system in accordance with claim 1, wherein when the second terminal receives an event of purchase of an article or provision of a service from the first information processing section, terminals to which the amount of affiliate is delivered, and a ratio of affiliate for terminals are designated.

17. The network advertisement delivery system in accordance with claim 1, wherein in a situation in which the first terminal receives an event of purchase of an article or provision of a service from the first information processing section, a terminal elected from the second terminal and other terminals is notified of reception of purchase of the article or the provision of the service, the second terminal and other terminals being associated with the first terminal, and the terminals to be notified being restricted by the first terminal.

18. A network advertisement delivery system, comprising a plurality of terminals comprising a first terminal and a second terminal, wherein when terminals make a contribution to sales of articles or services, an amount of affiliate is divided among the terminals;
    a first information processing section that stores purchase information when users corresponding to each of the terminals purchase articles or services; and
    a second information processing section that stores information of terminals and association between the terminals,
    wherein the first information processing section provides the amount of affiliate to the second information processing section,
    wherein the second terminal issues a friendship registration request to a module of the second information processing section to register a friendship to a user of the first terminal,
    wherein the module notifies the request from a user of the second terminal to the first terminal,
    wherein, after the first terminal approves the request, the first terminal notifies to the module and the module notifies to the second terminal and registers the friendship between the first terminal and the second terminal, and
    wherein, after the friendship between the first terminal and the second terminal is registered, the module notifies to the second terminal an event that the user of the first terminal has purchased articles,
    wherein, after the first terminal approves the one-sided subscribe request, the module notifies to the third terminal that the event that the user of the first terminal has purchased the articles.

\* \* \* \* \*